United States Patent
Schenk et al.

[11] 3,755,860
[45] Sept. 4, 1973

[54] LOOP LOCK

[75] Inventors: Peter Schenk; Theodore Dzus, Sr., both of West Islip, N.Y.

[73] Assignee: Dzus Fastener Co., Inc., West Islip, N.Y.

[22] Filed: Mar. 17, 1972

[21] Appl. No.: 235,512

[52] U.S. Cl. .............. 24/243 R, 16/158, 24/221 R, 287/118
[51] Int. Cl. .......................... A44b 21/00, E05d 5/02
[58] Field of Search ............................ 16/86.1, 158; 287/104, 118; 24/243 R, 221 R, 243 AE, 243 C, 221 A, 221 K, 221 L

[56] References Cited
UNITED STATES PATENTS

| | | | |
|---|---|---|---|
| 2,123,068 | 7/1938 | Summers | 24/221 A |
| 2,339,591 | 1/1944 | Weber | 24/221 A |
| 2,446,070 | 7/1948 | Albin | 24/221 A |
| 2,613,419 | 10/1952 | Dorgelys | 24/221 R X |
| 3,055,071 | 9/1962 | Dzus et al. | 24/221 R |

FOREIGN PATENTS OR APPLICATIONS

| | | | |
|---|---|---|---|
| 553,157 | 2/1923 | France | 287/118 |
| 8,720 | 10/1906 | Great Britain | 16/158 |

*Primary Examiner*—Donald A. Griffin
*Attorney*—David S. Kane, Charles R. Hoffmann et al.

[57] ABSTRACT

A loop lock adapted to engage and retain two adjacent members in fixed position with respect to one another. A resilient body is provided having an arcuate closed end portion terminating in a pair of opposed legs. The legs are normally spaced apart to receive two adjacent members therebetween. An opening is in each leg with the openings being substantially aligned. A stud is provided with a flanged end portion and a body portion which is removably extendable through the openings in the legs until the undersurface of the flanged end bears against the first of the legs. At least one tab extends laterally from one of the second leg and the body of the stud and the other of the second leg and the body of the stud has a cam slot therein engageable with the tab. The stud is rotatable between a locked and unlocked position and when the stud is rotated into the locked position, the tab follows the cam slot and will cause the legs to be bent toward one another and engage and capture the two members therebetween. When the stud is rotated into the unlocked position, the tab will follow the cam slot in the opposite direction thereby releasing the resilient legs to permit them to automatically return to their normal position and disengage the two members.

8 Claims, 4 Drawing Figures

Patented Sept. 4, 1973

3,755,860

LOOP LOCK

BACKGROUND OF THE INVENTION

Often it is necessary to fasten two adjacent poles or rods together in a fixed position. Occasionally these poles or rods form a part of a mesh arrangement, for example, a mesh screen or cage utilized to retain material or other items within an enclsoure. In addition, along with the necessity of locking the two adjacent pieces of mesh material together by their end poles the locking arrangement often should be of the type which permits easy accessibility to the interior of the enclosure with a lock which may be easily opened and closed. Furthermore, the lock should be one which can be efficiently engaged with and removed from the end poles of the two portions of the screen enclosure which are to be separated.

Known devices are cumbersome and difficult to engage and disengage for locking and unlocking purposes. Devices which are currently in use and meet the relatively high strength requirements as well as the requirement of retaining the two end poles or members in relatively fixed position are rather complicated locking mechanisms of high cost. Extensive manipulation is required to open and close the devices. It should e kept in mind that it is also of value to have a lock which will open and close quickly and efficiently and will retain the engaged members in fixed position even under relatively high vibration conditions. As is often the case with meshed type enclosure arrangements, the lock must be one that need not be slipped over the tops of the adjacent members which are to be locked in order to properly position the lock. Therefore, in those instances where the lock cannot be easily axially slipped on and off the engaged members, a lock assembly which laterally attaches to the members would be a considerable improvement and of great value in that environment.

SUMMARY OF THE INVENTION

Therefore, with the above thoughts in mind, it is among the primary objectives of the present invention to provide a lock which may be quickly and efficiently assembled and disassembled to two adjacent rigid members to retain them in fixed position even under relatively high vibration conditions. The lock is one which may be open and closed quickly and efficiently under conditions where it is not possible to axially slip the lock on and off the two members in engagement. Additionally, the lock is one of low cost design and is economical to manufacture and sell.

Therefore, in summary a loop lock adapted to engage and retain two adjacent members in fixed position with respect to one another. A resilient body is provided having an arcuate closed end portion terminating in a pair of opposed legs. The legs are normally spaced apart to receive two adjacent members therebetween. An opening is in each leg with the openings being substantially aligned. A stud is provided with a flanged end portion and a body portion which is removably extendable through the openings in the legs until the undersurface of the flanged end bears against the first of the legs. At least one tab extends laterally from one of the second leg and the body of the stud and the other of the second leg and the body of the stud has a cam slot therein engageable with the tab. The stud is rotatable between a locked and unlocked position and when the stud is rotated into the locked position, the tab follows the cam slot and will cause the legs to be bent toward one another and engage and capture the two members therebetween. When the stud is rotated into the unlocked position, the tab will follow the cam slot in the opposite direction thereby releasing the resilient legs to permit them to automatically return to their normal position and disengage the two members.

With the above objectives, among others, in mind, reference is made to the attached drawings.

DESCRIPTION OF THE PREFERRED EMBODIMENT

Figure 1:
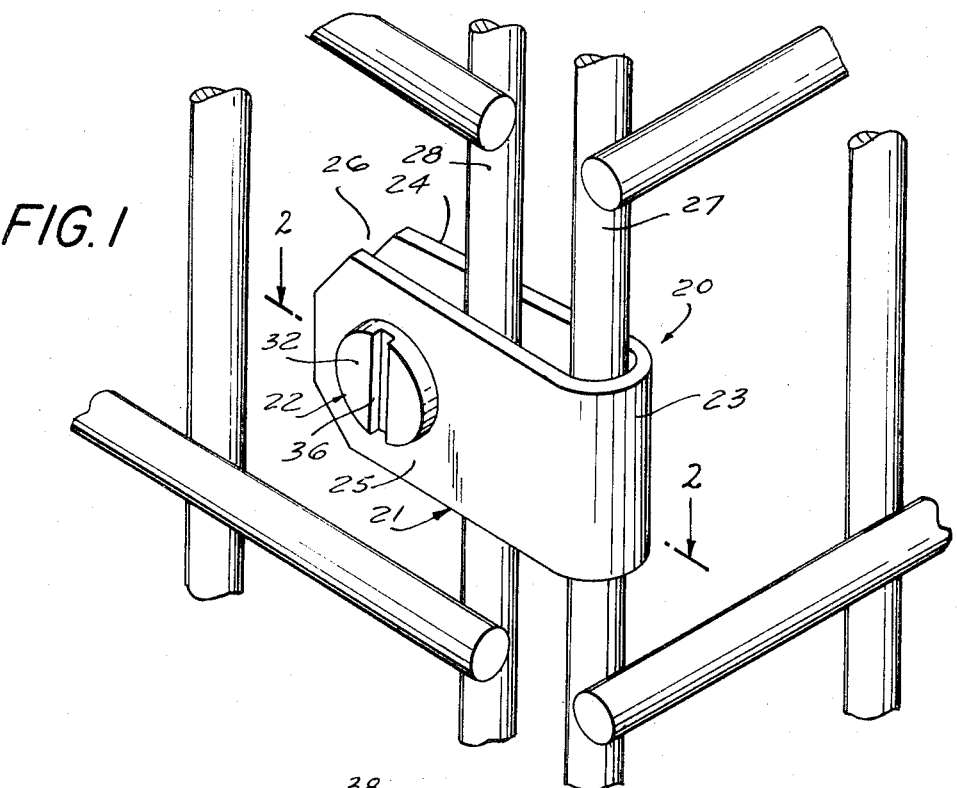
FIG. 1 is a fragmentary perspective view of the loop lock of the invention as shown in locked position with respect to two adjacent pieces of meshed screen.

The loop lock 20 includes a body portion 21 and a stud member 22. Body portion 21 is a U-shaped member including an arcuate closed end portion 23 and a pair of opposing rectangular shaped legs 24 and 25. In relaxed position, legs 24 and 25 are in substantially parallel relationship. Legs 24 and 25 are spaced apart and terminate in an open end 26 through which the members to be locked can be received and, of course, removed therefrom when unlocked. Body 21 is of a resilient and high strength material to permit flexibility to a predetermined degree for locking purposes as will be described in detail below. Stud 22 is of a rigid material. Body 21 and stud 22 may be constructed of any convenient material such as a metal as shown or a plastic. All that is required is that the components meet the necessary strength requirements and that the body 21 be resilient or flexible to the desired extent and that the stud be rigid and of sufficient strength for the desired use.

For exemplary purposes, the loop lock 20 is shown in engagement with two adjacent pieces of wire mesh wherein the end poles 27 and 28 of the two adjacent pieces of mesh are held in locked and fixed position with respect to one another to assist in forming an enclosure. Naturally, even though only one loop lock 20 is shown in engagement with end poles 27 and 28, depending upon the vertical height of the enclosure, any desired number of locks 20 in vertical arrangement may be employed to complete the rigid interengagement of the end poles and formation of the enclosure. It should be noted that in the environment shown, it is not possible to slip the loop lock 20 over end poles 27 and 28 from above or from below. Therefore loop lock 20 is designed to receive end poles 27 and 28 in another fashion as will be described in detail below.

Leg 25 has an opening 29 adjacent the end opening 26 of body 21. The other leg 24 has an opening 30 which is also adjacent open end 26 of body 21. Openings 29 and 30 are in substantial alignment to receive stud 22. A pair of diametrically opposing tabs 31 extend inwardly into opening 30 of leg 24.

Stud 22 had a flanged head portion 32 and a cylindrical body portion 33 of lesser diameter than the flanged head portion 32. In this manner, a shoulder 34 is formed on the undersurface of head portion 32. The end of body portion 33 distal from head portion 32 contains a pair of spiral cam slots 35. The cam slots 35 are on opposite sides of stud body 33 and are open at the end of stud body 33 distal from head portion 32 so as to receive tabs 31 when stud 22 is extended through openings 29 and 30 in body 21.

Figure 2:
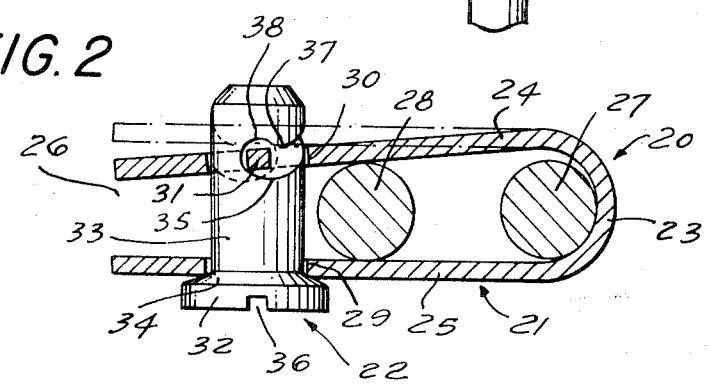
FIG. 2 is a sectional view of the loop lock taken along the plane of line 2-2 of FIG. 1.
Figure 3:
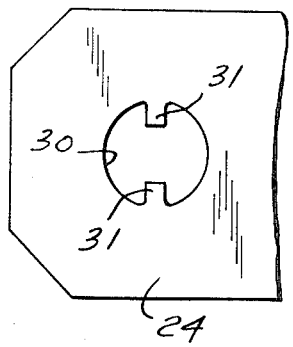
FIG. 3 is a fragmentary side elevation view of one of the legs of the body portion of the loop lock of the invention.
Figure 4:
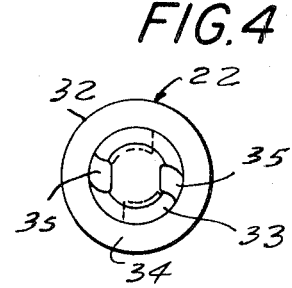
FIG. 4 is an end elevation view of the stud portion of the loop lock of the invention.

In operation, when it is desired to use loop lock 20 to fasten two adjacent mesh units to form an enclosure, the end poles 27 and 28 are slid into body portion 21 through opening 26. The end poles or members 27 and 28 are positioned inwardly of openings 29 and 30. Stud 22 is then extended through openings 29 and 30 as shown in FIG. 2 until the shoulder 34 bears against the outer surface of leg 25. The stud is rotated until cam slots 35 are aligned with the respective tabs 31 which fit within the cam slot 35 to form cam followers.

A slot 36 is positioned in the rear surface of head 32 to facilitate engagement of a tool with stud 33 and rotate it with respect to body 21. As stud 33 is rotated, tabs 31 travel in spiral cam slots 35 causing at least one of the legs to bend as tabs 31 travel inwardly towards head 32. As previously stated, the undersurface of shoulder 34 of head 32 bears against leg 25 which may also be displaced inwardly as tabs 31 travel in spiral cam slots 35. However, in FIG. 2 only leg 24 is shown in bent position with the dotted lines representing the normal relaxed position of leg 24.

After stud 33 has been rotated approximately a quarter turn, legs 24 and 25 are brought into locking engagement with rods 27 and 28. As shown in FIG. 2 sufficient engagement is provided to maintain rods 27 and 28 in fixed relation to one another and to capture them within body 21 and interconnected stud 33. At this point, tabs 31 come in contact with a shoulder or a bump 37 in the path of cam slots 35. At this point, additional force is required to further bend leg 24 to permit tabs 31 to pass over bumps 37 and snap into locking recess 38. This occurs through the natural resiliency of leg 24 which will tend to slightly return to its normal position after it passes over bump 37 and reaches the end of cam slot 35 that forms a slight recess 38 to receive tabs 31. At that point, the loop lock 20 is in the final locked position retaining members 27 and 28 in fixed position. Additionally, by having tabs 31 seated in end recesses 38 considerable amount of vibration can be withstood by the loop lock without loosening of the locking arrangement.

To unlock the assembly it is merely necessary to reverse the rotation of stud 33 approximately one quarter of a full turn at which time tabs 31 will become disengaged with cam slots 35 and the stud can be removed. Body 21 can then be removed from members 27 and 28 which exit through opening 26 and the enclosure can be opened.

Naturally since tabs 31 must once again pass over bumps 37 in the cam slot path, a slightly greater amount of force is required to pass tabs 31 over bump 35 in initiating the unlocking operation. This is facilitated by the natural resilience of leg 24 which will bend the necessary additional amount to facilitate passage of tab 31 over bump 37.

In the above described manner, the loop lock 20 can be easily assembled and disassembled and, while in the locked position, will be resistant to excessive vibration.

Other embodiments are naturally contemplated by the invention, for example, the projecting lateral tabs which form the cam followers could be mounted on the stud body 33 with the mating cam slots being positioned on leg 30. In any event in such an embodiment operation of the loop lock would be similar to that of the depicted embodiment and the consequent advantages would be substantially the same as those discussed above in connection with the depicted embodiment.

Thus, the above discussed objectives, among others, are effectively attained.

We claim:

1. A loop lock adapted to engage and retain two adjacent members in fixed position with respect to one another comprising:
   a resilient body having an arcuate closed end portion terminating in a pair of opposed legs;
   said legs being normally spaced apart to receive two adjacent members therebetween;
   there being an opening in each leg with said openings being substantially aligned;
   a stud having a flanged end portion and a body portion extending therefrom;
   the body portion of the stud adapted to withstand a predetermined shear load and being removably extendable through the openings in said legs until the undersurface of said flanged end bears against the first of said legs and the body portion is spaced from the closed end portion of the resilient body;
   one of the body portion of the stud and the second of said legs having at least one tab extending laterally therefrom and the other of said body portion and said second leg having a cam slot thereon for engagement with said tab when said stud is extended through the openings in said legs; and
   said stud being rotatable between locked and unlocked positions whereby when said stud is rotated into the locked position, said tab will follow said cam slot and will cause said legs to be bent toward one another and engage and capture said two members therebetween in less than one revolution of the stud and to bring the loop lock into position to resist a high load acting between the closed end of the resilient body and the stud, and when said stud is rotated into the unlocked position said tab will follow said cam slot in the opposite direction thereby releasing said resilient legs to permit them to automatically return to their normal position in disengagement with the two members.

2. A loop lock adapted to engage and retain two adjacent members in fixed position in respect to one another comprising;
   a resilient body having an arcuate closed end portion terminating in a pair of opposed legs;
   said legs being normally spaced apart to receive two adjacent members therebetween;
   there being an opening in each leg with said openings being substantially aligned;
   at least one tab extending inwardly from the circumferential surface of one of said openings;
   a stud having a flanged end portion and an opposing cam slotted end portion adapted to withstand a high shear load;
   the cam slotted end portion being removably extendable through the openings in said legs until the undersurface of said flanged end bears against the other of said legs and said tab engages with said cam slot with the cam slotted end portion being spaced from the closed end portion of the resilient body;

said stud being rotatable between locked and unlocked positions whereby when said stud is rotated into the locked position, said tab will follow said cam slot and will cause said legs to be bent toward one another and engage and capture said two members therebetween in less than one revolution of the stud and to bring the loop lock into position to resist a high load acting between the arcuate closed end and the cam slotted end portion, and when said stud is rotated into the unlocked position said tab will follow said cam slot in the opposite direction thereby releasing said resilient legs to permit them to automatically return to their normal position in disengagement with the two members.

3. The invention in accordance with claim 2 wherein the pair of opposed legs are substantially parallel in the normal position.

4. The invention in accordance with claim 2 wherein there are a pair of diametrically opposed tabs extending inwardly from the circumferential surface of one of said openings and a corresponding cam slot on said stud for each of said tabs.

5. The invention in accordance with claim 2 wherein the flanged end portion of said stud forms a head, there being a slot in the rear surface of said head to facilitate engagement with the stud and rotation thereof with respect to the resilient body to shift between the locked and unlocked positions.

6. The invention in accordance with claim 2 wherein the cam slot in said stud is open at one end to receive the tab and includes a shoulder formed adjacent the other end thereof so that a predetermined amount of force is needed to pass the tab over the shoulder by displacement of at least one of the resilient legs and after the tab has passed over the shoulder the resilient legs tend to return to their normal configuration and will assist in holding the tab in locked position behind the shoulder.

7. The invention in accordance with claim 6 wherein when the tab is in the locked position a predetermined amount of force is needed to pass the tab over the shoulder by displacement of at least one of the resilient legs by rotation of the stud in the unlocking direction whereby continued rotation in the unlocking direction will disengage the tab from the cam slot to permit the resilient legs to return to their normal position and disengage the two members.

8. The invention in accordance with claim 2 wherein the loop lock is positioned to hold the end poles of two adjacent pieces of mesh screen with the end poles forming the two adjacent members in locked position.

* * * * *